Sept. 15, 1953 M. E. WOLLIN 2,652,295
ROTARY BEARING CONSTRUCTION
Filed May 5, 1949 2 Sheets-Sheet 1
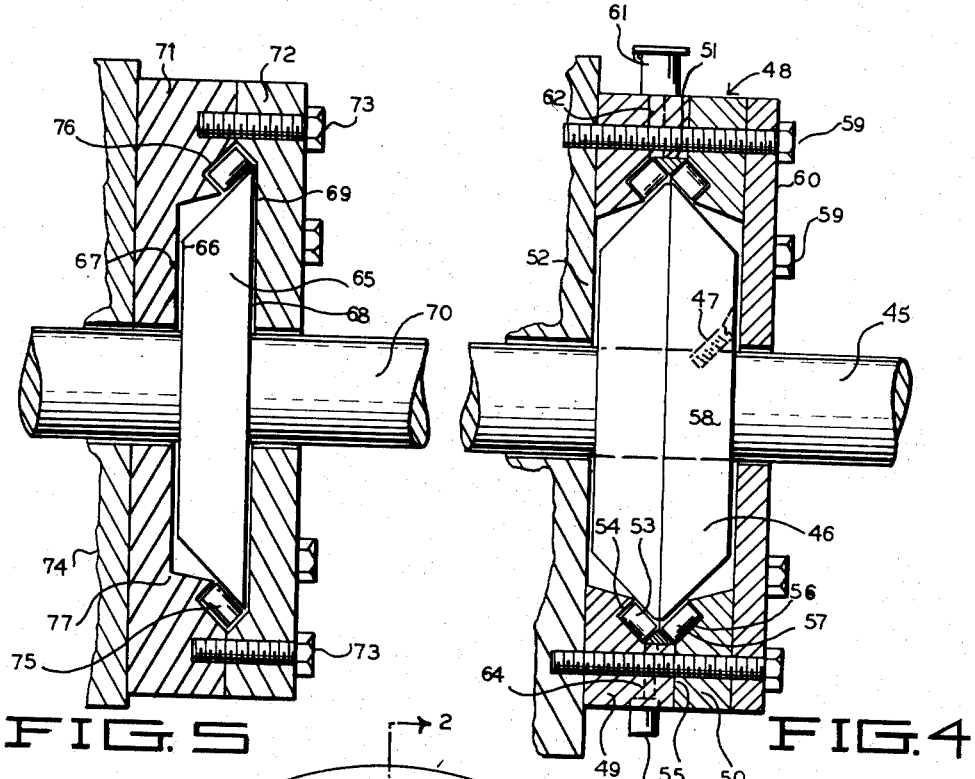
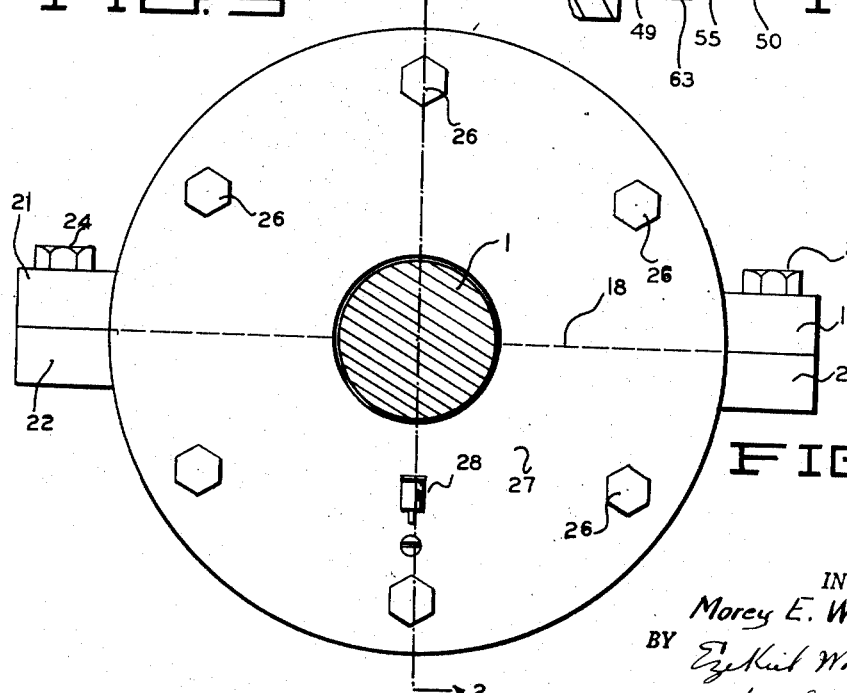
INVENTOR.
Morey E. Wollin
BY
his Attorney Sept. 15, 1953 M. E. WOLLIN 2,652,295
ROTARY BEARING CONSTRUCTION
Filed May 5, 1949 2 Sheets-Sheet 2

INVENTOR.
Morey E. Wollin
BY

Patented Sept. 15, 1953

2,652,295

UNITED STATES PATENT OFFICE 2,652,295

ROTARY BEARING CONSTRUCTION

Morey E. Wollin, Harrisburg, Pa.

Application May 5, 1949, Serial No. 91,550

5 Claims. (Cl. 308—174)

The present invention relates to a new type of bearing which will reduce friction, provide easy and permanent lubrication and will have in addition good wearing qualities.

In the present invention, instead of or in combination with a cylindrical bearing surface, a tapered ring bearing surface is used which preferably is of larger diameter than the cylindrical bearing surface. The tapered bearing surface should provide a much smaller bearing area so that the frictional surface is decreased to a minimum dependent upon the limits in accordance with the hardness of the materials which are used, the pressures and stresses on the supporting bearing element, and the other structural and operating factors as for instance velocity of the moving surfaces, permissible wear, rotational and thrust stresses. These various factors may have to be taken into account in determining the angle of taper, the amount of contact surface, and the size and number of ring bearings which are used.

Without further discussion of the merits and advantages of the present invention, the invention will be considered more thoroughly in the specification set forth below when taken in connection with the drawings illustrating embodiments of the same in which Figure 1 illustrates a side elevation of the present invention.

Figure 4 shows a further modification of the arrangement of Figure 2 and Figure 5 shows a further modification of the arrangement of Figure 4 as applied to a thrust bearing.

Figure 2:
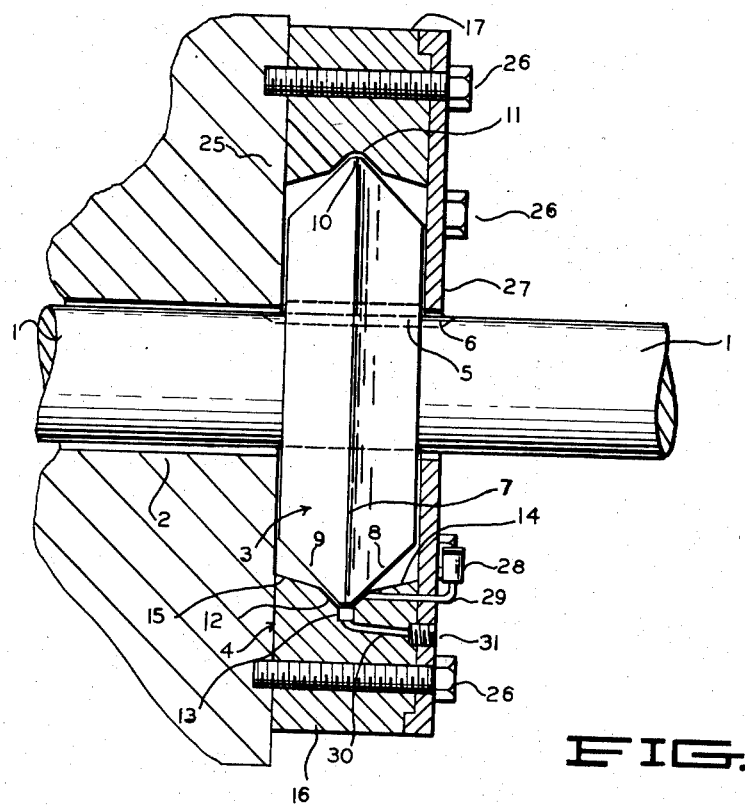
Figure 2 shows a section taken on the line 2—2 of Figure 1.

In the arrangement indicated, in Figures 1 and 2, 1 indicates a cylindrical shaft which may rotate a motor, drum, propeller or any desired mechanism. As indicated more clearly in Figure 2, the shaft on the left may run in a bearing surface 2 but this may if desired be dispensed with and the complete support for the shaft may be supplied by the tapered ring 3 rotated in the bearing 4. The tapered ring 3 may be attached to the shaft 2 in any usual manner as for instance by a key 5 and keyway 6 or any other method may be used, or the ring may in fact be formed as a part of the shaft itself. The tapered ring 3 is preferably of a larger diameter than the shaft 1 and is symmetrical with a center plane running through the circle 7 defining the largest conical diameter at the center of the ring. The surfaces 8 and 9 are symmetrical with a decreasing taper from the center plane or circle 7. The surface on the line 7 may come to an edge if desired but in most cases it is preferable to round the edge as indicated at 10 unless the well 11 is grooved deep enough so that the edge is provided with sufficient play so that it will not contact the bearing wall. The bearing 4 in which the ring rotates comprises a central tapered section 12 which has symmetrical tapered side walls formed or lapped to fit the tapers 8 and 9 so that the extremely tapered edge of the ring will ride in the tapered section 12 of the bearing. The section 12 may be cupped at the bottom as indicated at 13, and this cup or well section may extend upwards around the bearing from the lowest point to provide a place for lubricating oils which the tapered section of the ring at its outermost diameter picks up in its rotation through the well to provide lubrication about the entire ring. The bearing wall leaves the tapered surfaces of the ring 8 and 9 in the sections 14 and 15 so that a minimum of contact area will be provided between the ring and the bearing surface.

Figure 1 shows a means by which the bearing may be assembled on the shaft ring. The bearing comprises two halves 16 and 17 which engage one another along a diameter indicated by the dotted line 18, Figure 1. These two halves may be held together in any suitable manner. In Figure 1, they are bolted together in outwardly extending flanges 19, 20, 21, and 22 by means of the bolts 23 and 24. The two halves of the ring may be held to a supporting wall 25 by a series of bolts 26 which also hold the outer or face plate 27 in place which acts as a cover and as a means for returning the lubricating oil back into the well. The ring may be lubricated through the lubricating cup 28 which may have a pipe connection 29 to the top of the well. A drain pipe 30 may also be provided with a cap plug 31 which is removable to allow the oil to drain out of the well. The rotating ring has a minimum bearing surface area against the bearing wall as far as the width of the bearing is concerned. Since the ring however is larger than the normal shaft used for the same purpose, the length of the bearing about the circumference of the ring in the base contact section is substantially larger than that which would obtain in the shaft for the same width. The increase in the diameter of the bearing ring over that of the shaft which would ordinarily be used provides a less steep gradient in the direction of rotation of the ring so that in effect the larger ring more nearly rolls along a level plane. Perhaps theoretically, this would have no effect if the contact metal surfaces would be free from friction but since this condition does not exist, the enlarged ring with its narrower width contact and its longer length contact provides a noticeable advantage in reduction of friction.

Figure 3:
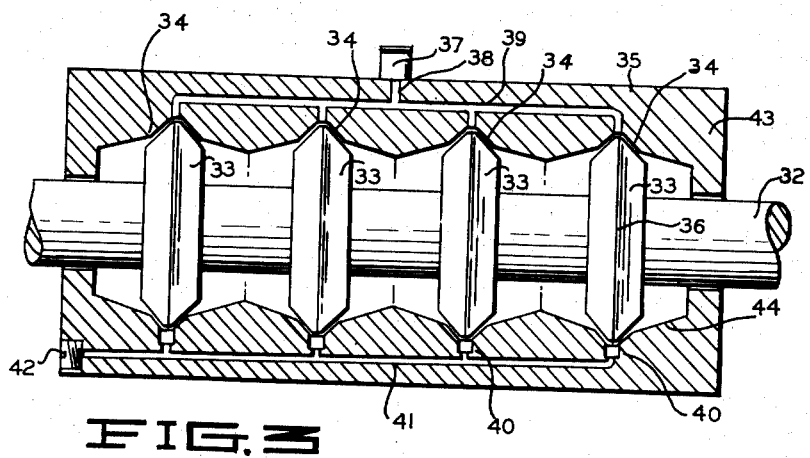
Figure 3 shows a modification of the arrangement of Figure 2.

In the arrangement shown in Figure 3, the shaft 32 is provided with a plurality of double tapered rings 33, etc., keyed or locked to the shaft 32 in any suitable manner. These tapered rings rest in corresponding fitting tapered annular cavities 34 in the bearing housing 35. The individual rings are symmetrical about the center plane lines 36 and the contour surface of the rings may be sections of cones or other tapered surfaces of revolution may be used. It is necessary in all cases that the grooved or recessed bearing fit the shape of the surface of the ring and be sufficiently smooth and uniform as in the usual case of rotating bearing contacts.

Figure 3 shows an oil supply system which comprises a reservoir or cup 37 communicating through the supply lines 38 and 39 to each individual bearing at its top as shown in Figure 3. Drains 40, etc., communicating with a common conducting pipe 41 connect to the drain plug 42 in the side of the bearing. The supporting housing element 43 of the bearing in which the bearing surfaces are formed has a hollow space between bearing rings sufficient to allow free movement of the shaft 32. The bearing surface 34 in which the ring rests is recessed away from the ring as shown at 44 so that the friction contact between the rings 33 and the surface 34 is narrowed to the small area in the region about the center plane 36.

The arrangement indicated in Figure 4 may be applied equally well to the construction shown in Figures 1 and 2 and also to the construction of Figure 3. In Figure 4, the supporting bearing may have a roller or ballbearing ring on which the ring supporting the shaft may roll. Referring more particularly to Figure 4, the shaft 45 has fixed to it the ring 46 which is of the same type as described in connection with the other figures. This ring is shown attached to the shaft by means of a set screw 47. The ring bearing 48 is made in a number of parts. These parts comprise two annular sections 49 and 50 and an insert fitting element 51. The annular ring section 49 is mounted against a frame 52 in which the shaft 45 may rotate. The element 49 is formed with a short cylindrical recessed surface which may be concentric to the axis of the shaft and of dimensions such that the outer surface of the ring 51 will make a good close fit against the cylindrical surface of the section 49. The surface in which the piece 51 rests may have an enlarged taper towards the edge from which the ring 51 is inserted but the taper cannot be in the opposite direction since under such conditions the ring 51 could not be put into place.

The section 49 is also formed to contain the roller bearings 53. These roller bearings may be contained in a chase and fitted into the cavity 54 running all around the inner surface of the section 49. The section 50 fits the section 49 in the common surface 55 which may be provided with a gasket or some other means for preventing a leak of oil from the bottom of the well formed by the two bearing pieces 49 and 50. The section 50 is also recessed in a ring or groove 56 concentric with the center line of the shaft for holding the cage 57 containing the roller bearings. The angular surfaces formed by the two roller bearing chases may be symmetrical with the center plane including the diameter 58 of the ring or if desired, one side of the bearing may have its angular surface directed differently from the other and may even have a 90° angle in the case of a thrust bearing which will be described in connection with Figure 5.

The parts of the bearing in Figure 4 are held together by a series of bolts 59 which pass through a plate 60 and each of the sections 49 and 50 of the bearing casing forming a complete casing for supporting the bearing ring 46. In assembling the bearing, the section 49 is first applied, then the roller ring with the rollers 53 are put in place in the cavity 54, then the ring 51 which has a triangular section and then the section 50 into which the cage 57 has already been positioned. The ring 46 is put in place after the complete half 49 has been assembled and before the back half 50 of the bearing is put in place. When the bearing is thus assembled, the plate 60 and bolts 59 may be tightened in place. The bearing may be lubricated by means of an oil cup 61 which connects through a communicating passage 62 to the roller bearing rings. Similarly, an oil drain may be provided at 63 with a communicating passage 64 connecting to the lower point of the well in which the ring 46 runs.

The arrangement of Figure 4 provides a complete roller bearing surface in combination with a tapered ring bearing and in this way provides a minimum rolling friction.

The arrangement indicated in Figure 5 is similar to that in Figure 4 with the exception that the ring 65 is not symmetrical about a central diametrical section. The arrangement of Figure 5 is more particularly used where thrust bearings are needed. In this case, the thrust bearing surfaces are to be found between the flat surface 66 of the smaller face of the tapered ring against the bearing wall 67, and the larger surface 68 of the tapered ring against the bearing wall 69. These thrust bearing surfaces 67 and 69 take up and support the shaft 70 in motion to the right or left as indicated in Figure 5. To the extent that the surfaces 66 and 68 of the ring may roll against the flat plate bearing surfaces, the principles of little contact area for reducing friction does not of course apply.

In the arrangement in Figure 5, the supporting bearing comprises two sections 71 and 72 which are bolted together by means of bolts 73. The section 71 may be attached to a frame 74 and is recessed in a manner similar to the section 49 of Figure 4 to receive the roller bearing ring or cage 75 set in an annular recess 76. The cover plate 72 is formed to cover over the end of the cage 75 and to provide the thrust bearing 69 against the face of the ring 65. The tapered ring 65 forms contact substantially only in the roller bearing region 75 since the wall 77 of the bearing half 71 is cut away from the surface of the bearing ring so that contact will only occur in this area.

While the present invention has been described in connection with a number of modifications, it is quite evident that some of the features of construction may be varied within the scope of the present invention as for instance the exact contour of the tapered bearing surface of the ring and that of its bearing support. Since in general these surfaces will be right sections of cones or somewhat near to such described surfaces, it will be assumed in the present application that these will generically be included under conical surfaces.

Having now described my invention, I claim:

1. In combination with a rotatable shaft, a bearing comprising a ring member rigidly mounted on said shaft having a section through the axis of rotation of the ring formed with parallel side walls extending perpendicular to the shaft and capped by a contour in the general form of a V, a supporting bearing for housing said ring having one section with an annular recess therein, anti-friction rolling bearing means mounted in said recess providing a contacting surface on one side of the V, a second section of said supporting bearing with an annular recess positioned therein similar to said first recess having anti-friction rolling bearing means mounted in said second section providing a contacting surface on the other side of the V, and means holding said sections together.

2. In combination with a rotatable shaft, a bearing comprising a ring member rigidly mounted on said shaft having a section through the axis of rotation of the ring in the general form of a V, a supporting bearing for housing said ring having one section with an annular recess therein, anti-friction rolling bearing means mounted in said recess providing a contacting surface on one side of the V, a second section of said supporting bearing with an annular recess positioned therein similar to said first recess having anti-friction rolling bearing means mounted in said second section providing a contacting surface on the other side of the V, and means holding said sections together, said sections being substantially halves of the whole supporting bearing.

3. In combination with a rotatable shaft, a bearing comprising a ring member mounted on said shaft having a section through the axis of rotation of the ring in the general form of a V, a supporting bearing for housing said ring having two sections with annular recesses therein having roller bearing means therein forming anti-friction contact surfaces contacting the V-shaped sides of the bearing ring and a ring member having a sectional shape to fill the space between the adjacent ends of the roller bearing means.

4. In combination with a rotatable shaft, a bearing comprising a ring member mounted on said shaft having a section through the axis of rotation of the ring in the general form of a V, a supporting bearing for housing said ring having two sections with annular recesses therein with the side wall of the recess adjoining the faces of the bearing sections opposed to each other being parallel to the axis of the ring, a pair of roller bearing means each resting in one of said recesses, a ring having a triangular section positioned between said roller bearing means, and means holding said bearing together.

5. In combination with a rotatable shaft, a bearing comprising a ring member mounted on said shaft having a section through the axis of rotation of the ring in the general form of a V, a supporting bearing for housing said ring having two sections with annular recesses therein with the side wall of the recess adjoining the faces of the bearing sections opposed to each other being parallel to the axis of the ring, a pair of roller bearing means each resting in one of said recesses, a ring having a triangular section positioned between said roller bearing means, and means holding said bearing together including a face plate on the outer side of said bearing and bolt means passing through said bearing sections.

MOREY E. WOLLIN.

References Cited in the file of this patent

UNITED STATES PATENTS

| Number | Name | Date |
| --- | --- | --- |
| 93,348 | Robirds | Aug. 3, 1869 |
| 215,782 | Wilson | May 27, 1879 |
| 923,652 | Heinz | June 1, 1909 |
| 954,529 | Lockwood | Apr. 12, 1910 |
| 2,065,311 | Hoke | Dec. 22, 1936 |
| 2,402,377 | Davenport | June 18, 1946 |

FOREIGN PATENTS

| Number | Country | Date |
| --- | --- | --- |
| 553,068 | France | May 12, 1923 |
| 491,739 | Germany | Feb. 14, 1930 |